United States Patent [19]
Kohno

[11] Patent Number: 5,552,902
[45] Date of Patent: Sep. 3, 1996

[54] FACSIMILE APPARATUS WITH INTERNAL MECHANISM FOR CONVEYING ORIGINALS AND RECORDING PAPER

[75] Inventor: Takeshi Kohno, Yokohama, Japan

[73] Assignee: Canon Kabushiki Kaisha, Tokyo, Japan

[21] Appl. No.: 599,106

[22] Filed: Feb. 9, 1996

Related U.S. Application Data

[63] Continuation of Ser. No. 255,932, Jun. 7, 1994, abandoned.

[30] Foreign Application Priority Data

Jun. 10, 1993 [JP] Japan ................................. 5-138120

[51] Int. Cl.⁶ ........................... H04N 1/00; H04N 1/31
[52] U.S. Cl. ............................. 358/498; 358/496
[58] Field of Search ........................... 358/400, 496, 358/498; 355/313, 317; 271/154, 155, 301, 304; 346/145; 347/108; H04N 1/00, 1/31

[56] References Cited

U.S. PATENT DOCUMENTS

| | | | |
|---|---|---|---|
| 4,866,531 | 9/1989 | Kobori | 358/400 |
| 4,953,037 | 8/1990 | Ito et al. | 358/496 |
| 5,025,326 | 6/1991 | Shimmyo | 358/498 |
| 5,157,505 | 10/1992 | Hashimoto et al. | 358/498 |
| 5,206,737 | 4/1993 | Sugiyama | 358/496 |
| 5,295,002 | 3/1994 | Ishii et al. | 358/498 |
| 5,321,845 | 6/1994 | Nukaya | 358/498 |
| 5,329,373 | 7/1994 | Hayashi et al. | 358/498 |

FOREIGN PATENT DOCUMENTS

0505969 9/1992 European Pat. Off. .
2665811 2/1992 France .

*Primary Examiner*—Kim Yen Vu
*Attorney, Agent, or Firm*—Fitzpatrick, Cella, Harper & Scinto

[57] ABSTRACT

A facsimile apparatus having an original conveying mechanism, a recording mechanism and a paper feeding mechanism each of which need not be provided with its own drive motor. Cost, size and weight are reduced by providing the minimum required number of motors. To this end, the facsimile apparatus is provided with a reading unit for reading an image of an original, an original conveying mechanism for conveying the original to the reading unit, a recording unit for recording a prescribed image on a recording sheet, a recording-sheet conveying unit for conveying the recording sheet to the recording unit and control means for selectively driving the original conveying mechanism and the recording-sheet conveying mechanism in prescribed fashion by a common drive motor, thereby conveying the original and the recording sheet.

16 Claims, 7 Drawing Sheets

FACSIMILE APPARATUS WITH INTERNAL MECHANISM FOR CONVEYING ORIGINALS AND RECORDING PAPER

This application is a continuation of application Ser. No. 08/255,932, filed Jun. 7, 1994 now abandoned.

BACKGROUND OF THE INVENTION

This invention relates to a facsimile apparatus constructed to have an internal mechanism for conveying originals and sheets of recording paper of a prescribed size.

Facsimile machines, which have recently gained popularity even in the home, are now required to have more sophisticated features. One such feature is the ability for such machines to use ordinary paper (paper sheets of a standard size such as size A4, hereinafter referred to as "cut sheets" or "recording sheets") instead of thermosensitive paper in the form of a roll, which heretofore has been the type of paper used most widely. Another feature is the ability to feed the recording sheets automatically. Facsimile machines of this more sophisticated type are gradually becoming dominant. It should be noted that the term "recording sheet" used here refers to a medium that is not limited to paper.

The components of a facsimile apparatus using such cut sheets include, as elements requiring motor drive, original conveying means for conveying an original to a reader, recording means for recording an image on a recording paper (sheet), and paper feeding means for separating recording paper one sheet at a time and feeding the recording paper into the recording means. In order to drive each of these means in a prescribed manner, the conventional facsimile apparatus generally is so constructed that the original conveying means, recording means and paper feeding means are each provided with a drive motor (stepping motor), a drive circuit and a driving power-supply unit, which are controlled individually.

SUMMARY OF THE INVENTION

In accordance with an arrangement provided with drive motors for respective ones of the original conveying means, recording means and paper feeding means, as in the above-described facsimile apparatus according to the prior art, the cost of the facsimile apparatus is high owing to the comparatively expensive drive motors as well as the motor drive circuits and supply power sources for these motors. In addition, since space is needed in order to install the necessary number of drive motors, it is difficult to make the facsimile apparatus small in size.

In the transmitting/receiving mode, which is the mode ordinarily used in a facsimile apparatus, control can be carried out in such a manner that the operation for reading an original and the recording operation will not be performed simultaneously. In the copy mode, in which a desired original is copied on a recording sheet, it is necessary that the sheet recording operation be performed at the same time as the operation for reading the original. Accordingly, at least two drive motors, which are relatively expensive in comparison with the other components, must be provided, one for the reading the original and one for the recording operation.

Further, additional motors are required in a facsimile apparatus of the type in which a plurality of originals and a plurality of recording sheets are set in the apparatus and sheets are picked up one at a time and conveyed automatically for reading and serial recording.

Accordingly, an object of the present invention is to provide a facsimile apparatus having at least original conveying means, recording means and paper feeding means, wherein the apparatus is reduced in cost, size and weight by providing the minimum required number of drive motors, without providing a motor for each of the above-mentioned means.

Another object of the present invention is to make it possible to execute a copy mode, which is carried out by recording a desired image onto a recording sheet by performing a sheet recording operation while carrying out the original reading operation by using the minimum required number of drive motors.

Yet object of the present invention is to provide a facsimile apparatus in which a plurality of originals and a plurality of recording sheets are set in the apparatus, and recording sheet is picked up in order to be get ready for serial recording, wherein both the original and the sheet transport can be performed using one drive motor.

According to the present invention, the foregoing objects are attained by providing a facsimile apparatus having reading means for reading an image of an original, original conveying means for conveying the original to the reading means, recording means for recording a prescribed image on a recording sheet, and recording-sheet conveying means for conveying the recording sheet to the recording means, characterized by having control means for selectively driving the original conveying means and the recording-sheet conveying means in prescribed fashion by a common drive motor, thereby conveying the original and the recording sheet.

In a preferred embodiment, the present invention provides a facsimile apparatus having reading means for reading an image of an original, original conveying means for conveying the original to the reading means, recording means for recording a prescribed image on a recording sheet, and recording-sheet conveying means for conveying the recording sheet to the recording means, and equipped with receiving, transmitting and copying functions, characterized by having copy-mode control means for performing control in such a manner that copying is carried out by performing a reading operation for reading of the original by the reading means and a recording operation for recording by the recording means separately with a time difference between them, whereby the original conveying means and the recording-sheet conveying means can be driven selectively by a common drive motor.

In a preferred embodiment, the present invention provides a facsimile apparatus equipped with receiving, transmitting and copying functions, comprising reading means for reading an image of an original, original conveying means for picking up originals, a plurality of which are supplied upstream of the reading means, one sheet at a time and conveying them to the reading means, serial recording means for serially recording prescribed images on recording sheets, and recording-sheet conveying means for picking up recording sheets, a plurality of which are supplied upstream of the recording means, one sheet at a time and conveying them to an entrance port of the serial recording means, conveyance by the original conveying means and conveyance by the recording-speed conveying means being performed separately with a time difference between them, whereby the original conveying means and the recording-sheet conveying means can be driven selectively by a common drive motor.

In the arrangement described above, drive of the original conveying means and drive of the paper feeding means is controlled by the control means in such a manner that the driving force of a single motor is transmitted selectively. Only the original conveying means is driven in the transmitting mode and only the paper feeding means is driven in the receiving mode. In the copy mode, control is exercised in such a manner that the paper feeding means and original conveying means are driven in alternating fashion. As a result, the functions of transmission, reception and copying required of a facsimile apparatus are realized fully while, at the same time, the drive motors and drive circuitry, power sources and the like accompanying the drive motors are held to the minimum necessary. This makes it possible to reduces the cost, size and weight of the apparatus.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
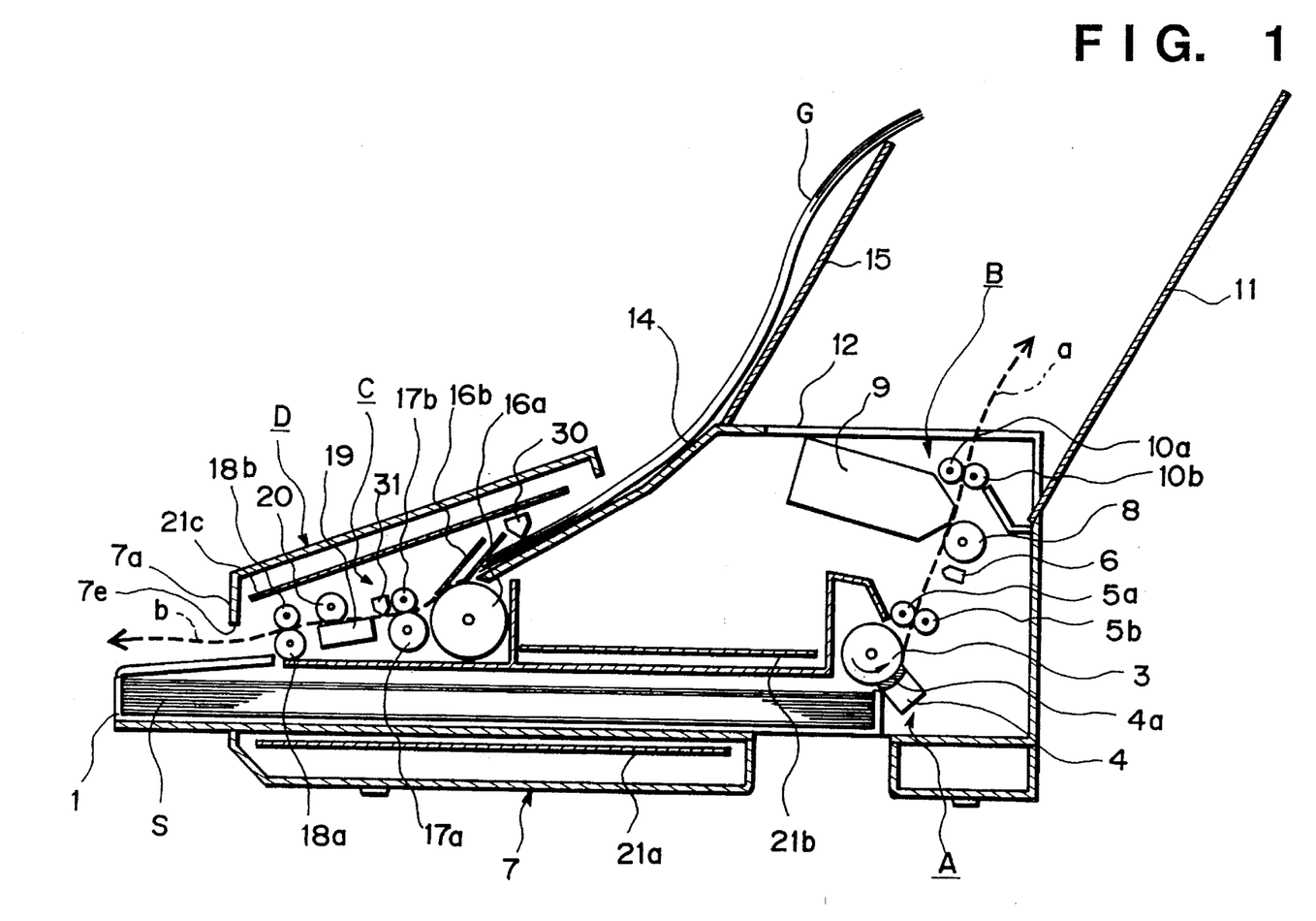
FIG. 1 is a longitudinal sectional view illustrating the structure of a principal portion of a facsimile apparatus according to a first embodiment of the present invention.
Figure 2:
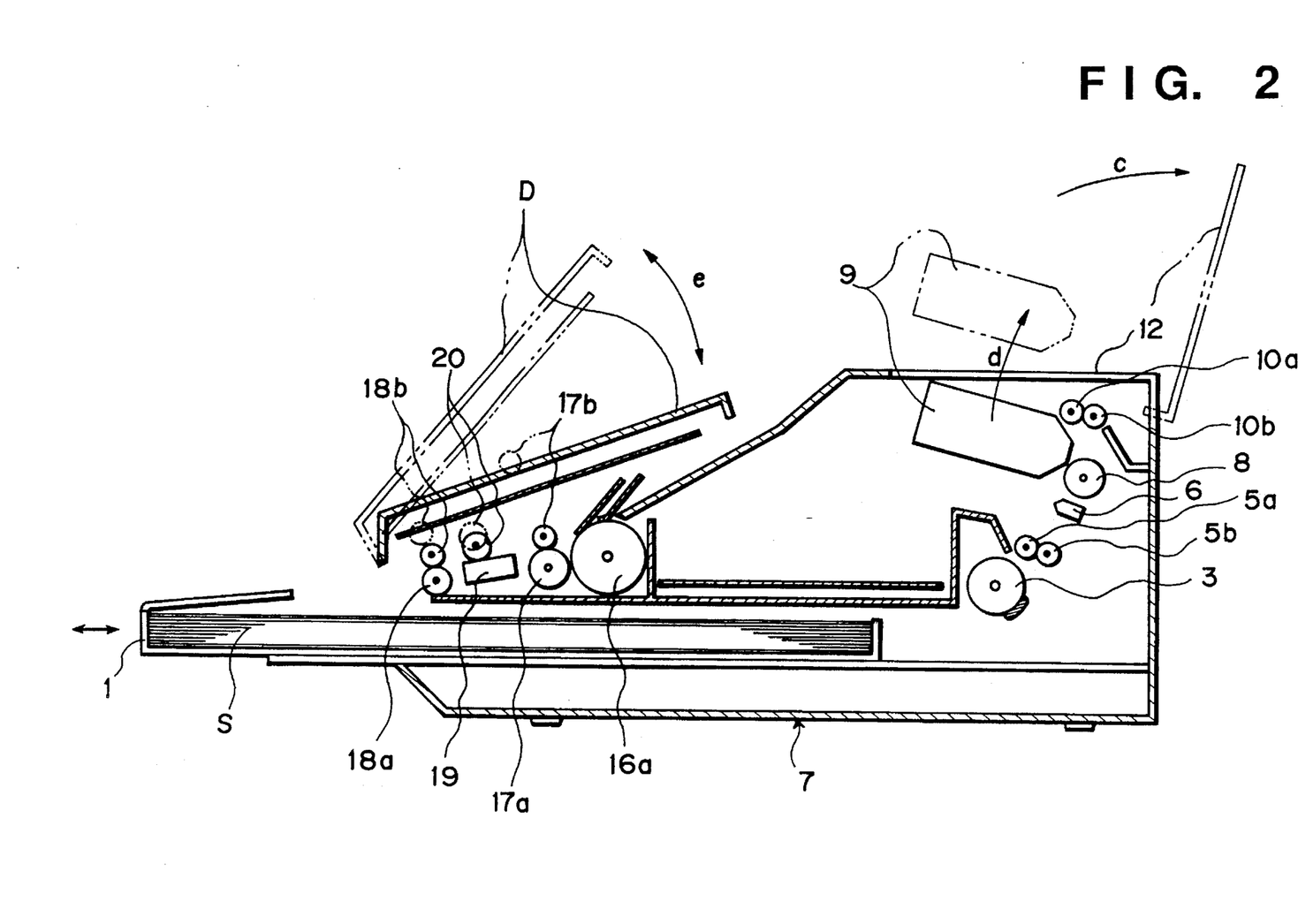
FIG. 2 is a longitudinal sectional view for describing the operation of the facsimile apparatus shown in FIG. 1.

Preferred embodiments of the present invention will now be described with reference to the drawings, in which FIG. 1 is a sectional view showing the construction of a principal portion of a facsimile apparatus according to a first embodiment of the present invention. In the embodiment illustrated here, recording means is provided with an ink-jet recording device of the serial recording type. FIG. 2 is a diagram for describing the operation of the apparatus shown in FIG. 1. (Description of overall facsimile apparatus)

The overall construction of the facsimile apparatus will now be described with reference to FIGS. 1 and 2. As illustrated in FIG. 1, the facsimile apparatus comprises a paper feeding section A for supplying recording sheets S one sheet at a time, a recording section B of the recording device, a reading section C for reading an image carried by an original, and a control panel D.

The paper feeding section A includes a paper-supply cassette 1 in which recording sheets S are stacked. The recording sheets S are separated in a paper feeder, which comprises a paper-supply roller 3 and a paper-supply element 4 in pressured contact with the roller 3, and the separated sheets are fed downstream to a pair of feed rollers 5a, 5b. The latter convey the separated recording sheets S farther downstream (in the direction of arrow a indicated by the dashed line) to supply them to the recording section B, described later.

A recording-paper edge sensor 6, which comprises a photosensor, microswitch or the like, is for ascertaining the position of the recording sheet S by sensing the leading and trailing edges of the recording sheet. The sensor 6 is provided just ahead of the recording section B, which performs recording on the recording sheet S conveyed in the manner described above.

As illustrated in FIG. 1, the apparatus has a main body 7 whose transverse cross section gradually tapers toward a front side 7a, which is provided with an opening 7e. As shown in FIG. 2, the paper-supply cassette 1 is provided so as to be capable of being freely loaded and unloaded via the opening 7e in the directions of the arrows. The paper-supply roller 3, paper-supply element 4, feed rollers 5a, 5b and edge sensor 6 are provided at respective mounting portions (not shown) formed within the main body 7.

In accordance with an image signal transmitted from another machine, an image signal transmitted from the reading section C, described below, or prescribed data outputted by a computer, described later, the recording section B records an image on the recording sheet S supplied from the paper feeding section A. More specifically, the recording sheet S is conveyed downstream by a platen roller 8 arranged in the recording section B, and ink droplets jetted from an ink-jet cartridge 9 in conformity with the image signal or prescribed data attach themselves to the recording sheet S, thereby forming one line of an image. The sheet is then conveyed further.

The recording sheet S on which the prescribed image has been recorded is conveyed further in the direction of arrow a. A pair of discharge rollers 10a, 10b convey the recording sheet S downstream to eject it from the apparatus, whereby the recording sheet S falls into a recording paper tray 11. The platen rollers 8 and the pair of discharge rollers 10a, 10b of the recording section B are provided at respective mounting portions (not shown) in the apparatus main body 7.

As shown in FIG. 2, a recording cover 12 is pivoted at one end and capable of being opened in the direction of arrow c to a position indicated by the two-dot chain line. By thus opening the cover 12, the ink-jet cartridge 9, which performs the recording operation described above, is capable of being unloaded from the apparatus by being moved in the direction of arrow d.

The reading section C irradiates an original G, which is illustrated in FIG. 1, with light, converts light reflected from the original G into an electric signal and transmits this signal to another machine or to its own recording section B in dependence upon each operating mode required of the facsimile apparatus.

More specifically, one or a plurality of originals G is placed upon a platen 14 and an original tray 15, one sheet of the original G is separated by a separating roller 16a and a pressuring element 16b in pressured contact with the separating roller 16a, and the original G is then transported in the direction of the arrow b indicated by the dashed line b in FIG. 1. The original G is conveyed by a pair of conveyance rollers 17a, 17b and a pair of discharge rollers 18a, 18b so as to be ejected to the outside from the opening 7e of apparatus 7.

While the original G is thus conveyed, image information is read in the reading section, which is constituted by a photoelectric transducer 19 such as a contact sensor and a white roller 20, which regulates the background at the time of reading. The image signal is transmitted to the recording section of the apparatus itself in the copy mode or to the recording section of another machine in the case of the transmitting mode.

Furthermore, an original sensor 30 for judging whether the original is in a state in which it is capable of being read is arranged slightly upstream of the separating roller 16a, and an original edge sensor 31 comprising a photosensor or a microswitch, etc., is provided between the pair of conveyance rollers 17a, 17b and the photoelectric transducer 19 in order to sense the leading and trailing edges of the original G and set the starting and end timings of the reading operation by the photoelectric transducer 19.

The platen 14, original tray 15, separating roller 16a, conveyance roller 17a, discharge roller 18a, photoelectric transducer 19 and white roller 20 are provided at respective mounting positions of the main body 7.

The control panel D is for performing such operations as mode changeover, copying, transmission and printing. As mentioned above, the control panel tapers toward the front of the apparatus. A plurality of keys (not shown) conforming to various operations are provided.

The control panel D is provided on the upper part of an original conveyance mechanism in the reading section C and is pivoted on the apparatus main body 7 so as to be capable of being opened and closed in the directions of arrow e shown in FIG. 2. A telephone handset (not shown) for transmission and reception is mounted on one side of the control panel D.

By virtue of the arrangement described above, the components essential for the facsimile apparatus can be disposed within the apparatus main body 7 efficiently, the ink cartridge 9 can be replaced easily, the reading section can be accessed with facility and the recording-sheet cartridge also can be replaced with ease.

Figure 3:
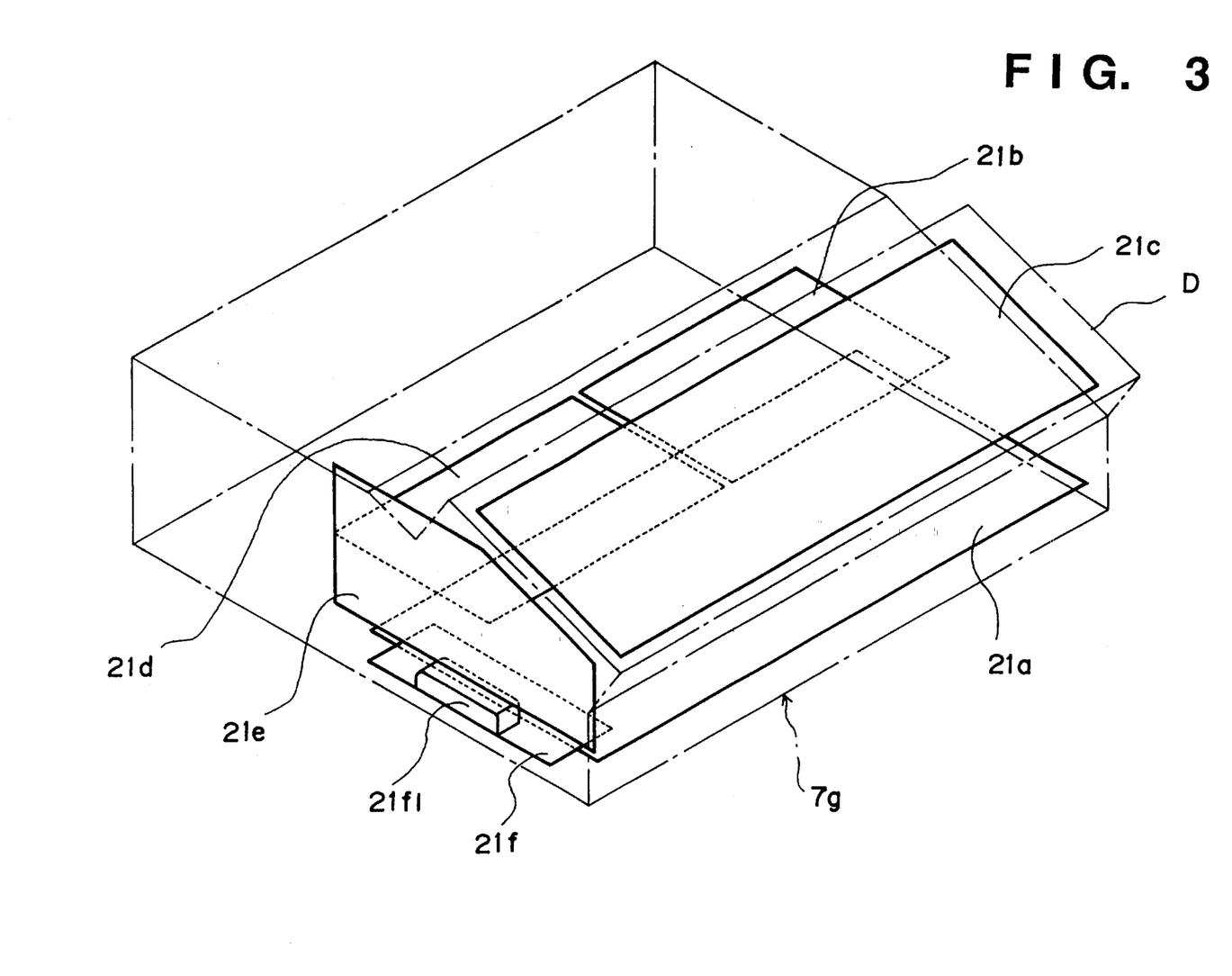
FIG. 3 is an external perspective view showing the relationship of electrical and electronic circuit boards in the facsimile apparatus.

FIG. 3 is an external perspective view showing the relationship between electrical and electronic circuits and the manner in which these are arranged. The apparatus has a system board 21a provided on a bottom 7g of the apparatus 7, and a power-supply unit 21b is provided on the right-hand side of the apparatus. A board 21c for controlling the control panel D, a relay board 21d, a board 21e for controlling the telephone and telephone lines, and a board 21f mounting a printer interface 21f1 are provided at respective positions, not shown. Providing each of the electronic circuit boards in this manner makes it easy to deal with generated heat and facilitates maintenance and inspection.

(Description of common motor drive system)

Figure 4:
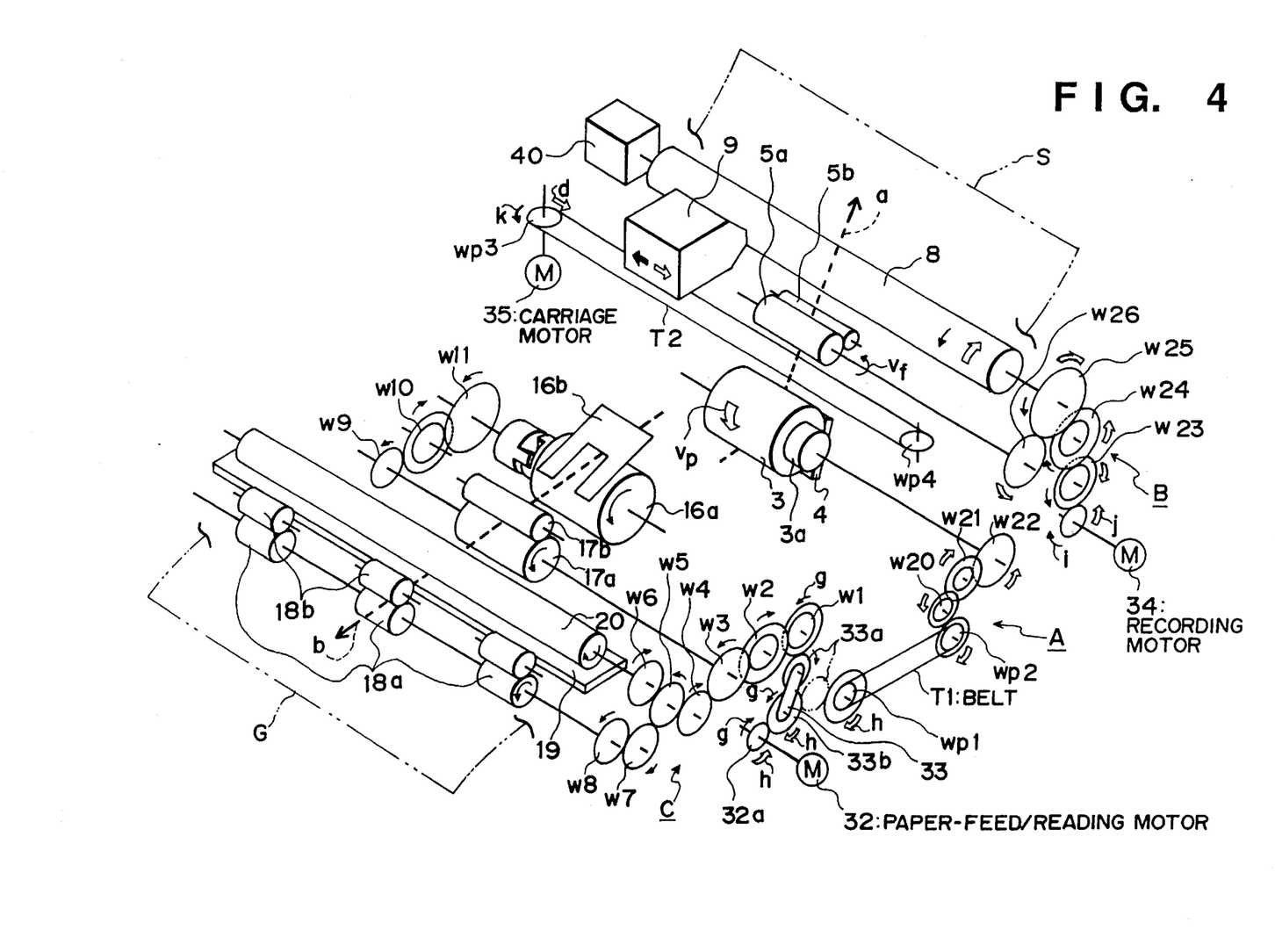
FIG. 4 is a diagram for describing the construction of a drive system in the facsimile apparatus according to the first embodiment of the invention.

The construction of the drive system characterizing the present invention will now be described with reference to an isometric view shown in FIG. 4. As shown in FIG. 4, a driving source comprises a paper-feed/reading motor 32 for driving the paper feeding section A and the reading section C, a recording motor 34 for conveyance of recording paper in the recording section B and for driving a cleaning device 40, which cleans the head of the ink-jet cartridge 9, and a carriage motor 35 for moving the ink-jet cartridge 9 in a main-scan direction. Thus, the apparatus is provided with a total of three motors, which are stepping motors.

The arrangement is such that the power from the paper-feed/reading motor 32 is coupled to either the paper feeding section A or the reading section C depending upon the rocking of a changeover arm 33 owing to rotation of the motor 32. To this end, a changeover gear 33a which rocks together with the changeover arm 33 is attached to the changeover arm 33 so as to be free to turn freely, and the changeover gear 33a is provided with side pressure relative to the changeover arm 33 by means of a spring, whereby a constant, weak rotational load is produced.

The changeover arm 33 is arranged to be free to turn on the same axis as a rotational-center gear 33b. The spacing between the changeover gear 33a and the rotational-center gear 33b is fixed and these two gears are meshing with each other at all times. When rotation is applied to the gear 33b by the paper-feed/reading motor 32, the changeover gear 33a and changeover arm 33 stop rotating relative to each other owing to the rotational load, as a result of which the changeover arm 33 rocks about the rotational-center gear 33b in the same direction. Power is transmitted by meshing between the changeover gear 33a and other gears. More specifically, by rotating the paper-feed/reading motor in the direction of arrow g in FIG. 4, the reading section C is driven to drive gears w1~w11. When the paper-feed/reading motor is rotated in the opposite direction, namely the direction of arrow h, the paper feeding section A is driven to drive a gear pulley wp1. As a result, gears w20~w22 meshing with a gear pulley wp2 are driven via a belt T1, thereby rotating the paper-supply roller 3.

A similar power changeover mechanism is incorporated within the cleaning device 40 in the recording section B as well. By rotating the recording motor 34 in the direction of arrow i in FIG. 4, the cleaning device 40 is driven via gears w23~w25. By rotating the recording motor 34 in the direction of arrow j in FIG. 4, the recording sheet S is conveyed via gears w23~w26.

The carriage motor 35 is adapted to drive a timing belt T2, which is fixed to a carriage (not shown) of the ink-jet cartridge 9, via pulleys wp3, wp4. Rotating the carriage motor 35 in the k direction moves the cartridge 9 to the left, and rotating the carriage motor 35 in the reverse or l direction moves the carriage 9 to the right. Accordingly, an image is formed while a prescribed ink-jet recording operation accompanying this movement is carried out.

The feed rollers 5a, 5b for conveying the recording sheet S have a peripheral speed Vf, and the paper-supply roller 3 has a peripheral speed Vp. It is so arranged that these peripheral speeds satisfy the relation Vp>Vf. A one-way clutch 3a is provided between the paper-supply roller 3 and a drive shaft secured to the gear w22. As a result, in conveyance of the recording sheet S, the paper-supply roller 3 attains a state in which it simply follows up the recording sheet S at the moment the recording sheet S, which has been separated and supplied by the roller 3, begins to be conveyed by the feed rollers 5a, 5b. Accordingly, the structure is such that the recording sheet S is conveyed by drive of the recording section B even when drive of the paper feeding section A is halted at the moment conveyance by the feed rollers 5a, 5b begins.

In other words, the one-way clutch 3a obtains driving force from the gear w22 and executes a power transmission in such a manner that the paper-feed roller 3 rotates in the counter-clockwise direction. However, when an external force acts upon the paper-feed roller 3, the one-way clutch 3a automatically interrupts the power transmission between the gear w22 and the paper-feed roller 3. A one-way clutch which functions in this manner is used also in the mechanism for changing over drive between the paper feeding section and reading section, described later.

(Example of drive control of each motor)

Operation of each motor when two originals G are copied successively in the foregoing facsimile apparatus will now be described with reference to the timing chart of FIG. 5.

S1: When two originals G are placed upon the platen 14, the original sensor 30 senses that an original is present, whereby a state is attained in which copying or transmission is possible.

S2: When a copy starting operation is performed using the control panel D, the paper-feed/reading motor 32 starts rotating in the h direction to begin a paper feeding operation. At the same time, the recording motor 34 also rotates in the j direction, thereby rotating the feed rollers 5a, 5b and the platen roller 8 to convey the recording sheet S when it is fed in from the paper feeding section A.

S3: When the recording-sheet edge sensor 6 senses the leading edge of the sheet, drive of the paper feeding section is halted in order that the recording sheet S can be conveyed solely by the recording motor 34.

S4: After the leading edge of the recording sheet S is sensed at S3, the sheet S is conveyed a fixed amount, thereby completing advance of the recording sheet S to the recording position. The recording motor 34 is then stopped. Further, the recording/reading motor 32 is rotated in the direction of arrow g to start separation and conveyance of the original G.

S5: The leading edge of the first original G is sensed by the original edge-sensor 31.

S6: After the leading edge of the original is sensed at S5, the original G is conveyed a fixed amount, whereupon the leading edge of the original G arrives at the reading position of the photoelectric transducer 19. As a result, the reading operation is started and an image signal is sent to the recording section B. Upon receiving the image signal, the reading section B rotates the recording motor 34 in the j direction. While the recording sheet S is being conveyed, a prescribed serial recording operation is performed by the image signal as the carriage motor 35 rotated in the forward and reverse directions.

S7: The trailing edge of the recording sheet S is sensed by the recording-paper edge sensor 6.

S8: The trailing edge of the first original G is sensed by the original-edge sensor 31.

S9: The leading edge of the second original G is sensed by the original-edge sensor 31.

S10: After the trailing edge is sensed at S7, the recording sheet S is conveyed a fixed amount until its trailing edge arrives at the recording position, after which recording is halted. Similarly, in the reading section C also, after the trailing edge of the first original G is sensed at S8, the original G is conveyed a fixed amount until its trailing edge reaches the reading position. Conveyance is then halted.

S11: The paper feeding operation is performed in the same manner as at S2. In addition, the first recording sheet S is ejected.

S12: Operation s performed in the same manner as at S3.

S13: In the same manner as at S4, the recording motor 34 is halted and the paper-feed/reading motor 32 is rotated in the direction of arrow g, whereby conveyance of the second original G is resumed. The first original is ejected.

S14: Reading starts at the moment the leading edge of the second original G, conveyed at S9, arrives at the reading position. The recording section B begins recorded in the same manner as at S6.

S15: Operation is performed in the same manner as at S7.

S16: The second original G is also conveyed and the original sensor 30 senses that there are no originals remaining.

S17: The trailing edge of the second original G is sensed in the same manner as at S8.

S18: Recording and reading are halted in the same manner as at step S10.

S19: The recording motor 34 is rotated a fixed amount in the j direction and the trailing edge of the recording sheet S is ejected from the recording system. At the same time, the paper-feed/reading motor 32 is rotated in the g direction to eject the trailing edge of the final original.

S20: The recording motor 34 is rotated a fixed amount in the i direction and the recording head portion of the ink-jet cartridge 9 is cleaned. This concludes the series of operations.

The copying mode is implemented by the operations described above. In the transmission mode, the only operation is reading of the original G. The operation of the paper-feed/reading motor 32, original sensor 30 and original-edge sensor 31 can be performed in a manner similar to that described above.

In the reception mode, the only operations are paper feed and recording. The operation of the paper-feed/reading motor 32, recording motor 34 and recording-paper edge sensor 6 can be performed in a manner similar to that described above.

(Second Embodiment)

Figure 6:
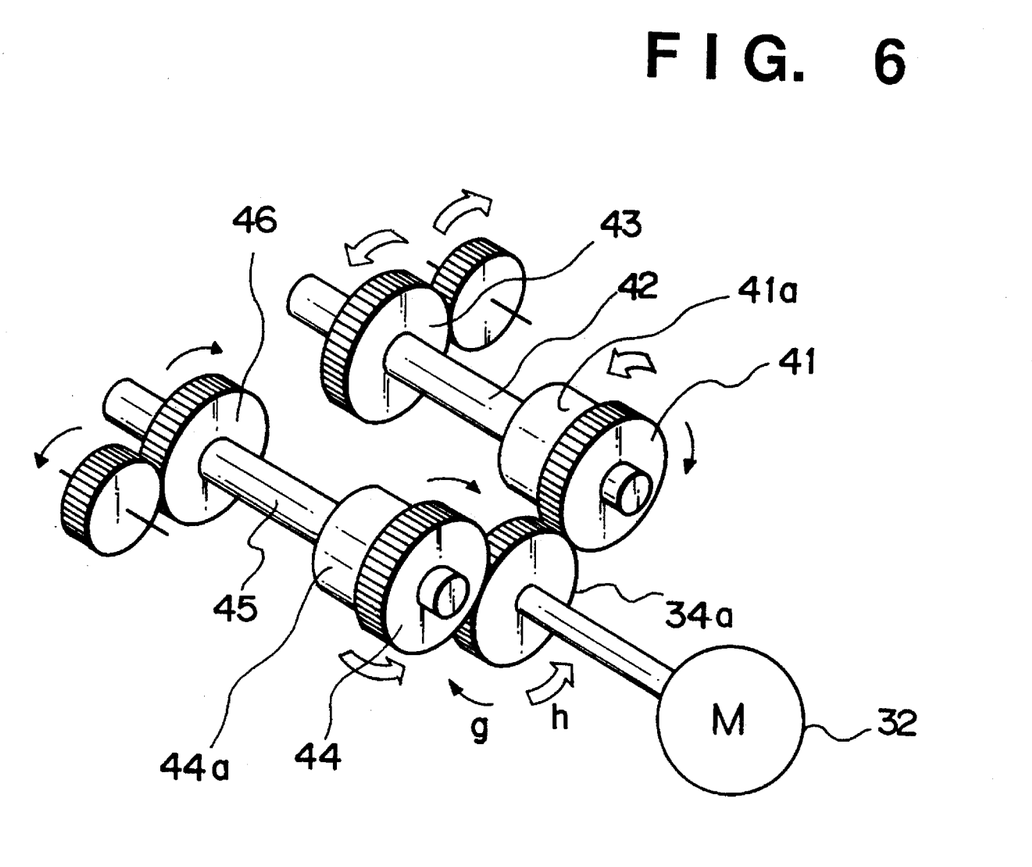
FIG. 6 is a diagram for describing the drive system of a facsimile apparatus according to a second embodiment of the present invention.

In the first embodiment set forth above, changeover between drive of the paper feed system and drive of the reading system is performed by a changeover arm utilizing forward and reverse rotation of the paper-feed/reading motor 32. However, this changeover in drive is not limited to that described above. As shown in FIG. 6, it is possible to realize the changeover by a mechanism in which the arm changeover portion is substituted by one-way clutches. This will be described based upon the external perspective view of FIG. 6.

As shown in FIG. 6, the paper-feed/reading motor 32 has an output gear 34a meshing directly with gears 41, 44. The gears 41, 44 have concentrically provided one-way clutches 41a, 44a, respectively, so that only rotation in one direction can be transmitted to shafts 42, 45, respectively. A paper feeding gear 43 is fixed to the shaft 42. The above-described paper feeding section is actuated by rotating the shaft 42. A reading gear 46 is fixed to the shaft 45. Rotating the shaft 45 actuates the reading section. When the output gear 34a of the motor is rotated in the h direction, the one-way clutch 41a of gear 41 assumes a locked state, whereby a state is attained in which the shaft 42 is driven. On the other hand, the one-way clutch 44a of gear 44 assumes a released state, as a result of which the shaft 45 does not rotate. Accordingly, only the paper feeding section operates; the reading section remains at rest.

Conversely, when the output gear 34a is rotated in the direction of arrow g, the one-way clutch 41a of the gear 41 assumes the released state and the one-way clutch 44a of the gear 44 assumes the locked state. The paper feeding section ceases operating and the reading section begins operating. As a result, an operation similar to that of the first embodiment can be realized.

(Third Embodiment)

Figure 7:
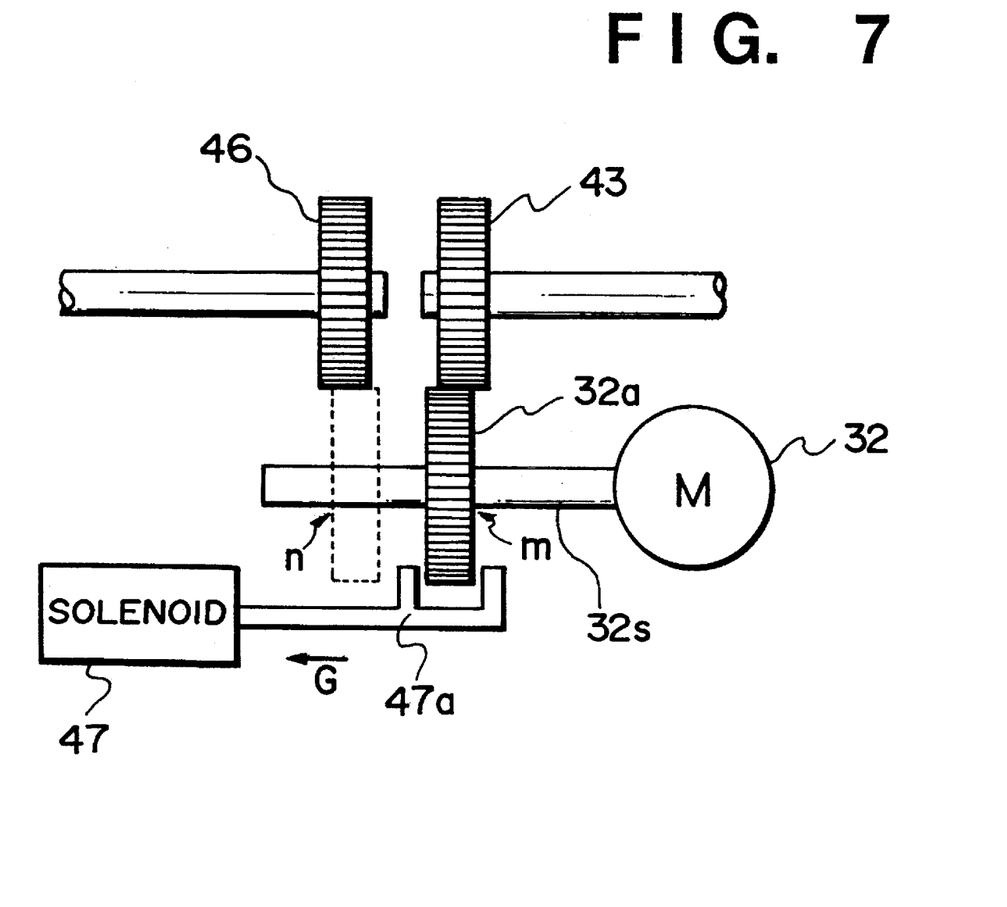
FIG. 7 is a diagram for describing the drive system of a facsimile apparatus according to a third embodiment of the apparatus.

FIG. 7 is a front view showing the drive changeover portion in a third embodiment in which gears are changed over by a solenoid. In FIG. 7, the outer circumferential surface of an output shaft 32s of the paper-feed/reading motor 32 is formed to have a spline or groove, etc. The output shaft 32s, which passes through a slide hole provided in an output gear 32a at the rotational center thereof, is fixed against movement in the direction of rotation but is capable of sliding freely in the longitudinal (thrust) direction. The position of the output gear 32a in the thrust direction is regulated by an actuator 47a connected to a solenoid 47. By moving the actuator 47a in the direction of arrow G using the solenoid 47, the output gear 32a is moved from position m to position n. The output gear 32a meshes with the paper feeding gear 43 when at position m and meshes with the reading gear 46 when at position n. By driving the solenoid 47 through the arrangement and operation set forth above, drive can be changed over between the paper feeding section and reading section without changing the direction of motor rotation.

(Other arrangements)

Each of the foregoing embodiments is described based upon a facsimile apparatus equipped with an ink-jet printer. However, a thermotransfer printer, a laser-beam printer or the like can be used as the recording section, and any recording means may be selected that is appropriate.

Thus, as described above, a mechanism is constructed in which power is selectively transmitted to drive of original conveying means and drive of paper feeding means depending upon the direction of rotation of a single motor, and control is performed so as to select transmission of power to either of these means. As a result, it is possible to delete one motor without detracting from the performance and capability of the apparatus. This is effective in terms of cost and space.

In accordance with the present invention as described above, in a case in which a facsimile apparatus is equipped with at least original conveying means, recording means and paper feeding means, each of these means need not be provided with its own drive motor. Cost, size and weight can be reduced by providing the minimum required number of drive motors.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus having reading means for reading an image of an original, original conveying means for conveying the original to said reading means, recording means for recording a prescribed image on a recording sheet, and recording-sheet conveying means for conveying the recording sheet to said recording means, a recording-sheet supply means for supplying the recording sheet to the entrance port of said recording-sheet conveying means, and equipped with receiving, transmitting and copying functions, comprising:

a first drive motor for driving said recording-sheet conveying means;

copy-mode control means for performing control in such a manner that copying is carried out by separately performing a reading operation for reading of the original by said reading means and a recording operation for recording by said recording means so that the supplying by said recording-sheet supply means and conveyance by said original conveying means are performed separately with a time difference between them;

recording-sheet storage means for stacking a plurality of the recording sheets, each recording sheet being a cut sheet having a predetermined size and being supplied to said entrance port of said recording-sheet conveying means after being picked up in a sheet-by-sheet fashion by said recording-sheet supply means; and a second drive motor which is commonly used to drive selectively said original conveying means and said recording-sheet supply means.

2. The apparatus according to claim 1, further comprising a rocking mechanism in which a rocking direction thereof is set in dependence upon a direction of rotation of said second drive motor in order to drive said original conveying means and said recording-sheet supply means in a prescribed fashion by said second drive motor, said rocking mechanism meshing with a power transmission mechanism of said original conveying means and a power transmission mechanism of said recording-sheet supply means.

3. The apparatus according to claim 1, wherein a one-way clutch is interposed in a power transmission mechanism system, said one-way clutch transmitting power to one of a power transmission mechanism of said original conveying means and a power transmission mechanism of said recording-sheet supply means in dependence upon a direction of rotation of said second drive motor in order to drive said original conveying means and said recording-sheet supply means in a prescribed fashion by said second drive motor.

4. The apparatus according to claim 1, further comprising an actuator for moving a drive gear of said second drive motor in a direction along a rotational axis of said drive gear to one of a power transmission mechanism of said original conveying means and a power transmission mechanism of said recording-sheet supply means to thereby mesh said drive gear with said one of the power transmission mechanisms in order to drive said original conveying means and said recording-sheet supply means in prescribed fashion by said second drive motor.

5. The apparatus according to claim 1, wherein a control panel is provided on an inclined side of an apparatus main body tapering toward a front side, said reading means is arranged below said control panel, said recording-sheet supply means, which is so adapted as to convey a plurality of stacked recording sheets to said recording-sheet conveying means one sheet at a time, said recording-sheet conveying means and said recording-sheet supply means are disposed at a rearward portion of said apparatus main body, and the original and recording sheets are each conveyed by selectively driving said original conveying means and said recording-sheet supply means in prescribed fashion by said second drive motor.

6. The apparatus according to claim 1, wherein said reading means comprises a contact sensor and a contact roller for reading an original while in contact with a surface thereof, the plurality of stacked recording sheets are accommodated in a cartridge freely loaded and unloaded via an opening in the front side of the apparatus main body, and said recording means employs a serial ink-jet recording method.

7. A facsimile apparatus equipped with receiving, transmitting and copying functions, comprising:

reading means for reading an image of an original;

original conveying means for picking up originals, a plurality of which are supplied upstream of said reading means, one sheet at a time, and conveying them to said reading means;

serial recording means for serially recording prescribed images on recording sheets;

recording-sheet conveying means for conveying the recording sheets to said recording means;

recording-sheet supply means for supplying the recording sheets to the entrance port of said recording-sheet conveying means, wherein the supplying by said recording-sheet supply means and the conveyance by said original conveying means are performed separately with a time difference between them;

recording-sheet storage means for stacking a plurality of the recording sheets, each recording sheet being a cut sheet having a predetermined size and being supplied to the entrance port of said recording-sheet conveying means after being picked-up in a sheet-by-sheet fashion by said recording-sheet supply means; and a second drive motor which is commonly used to drive selectively said original conveying means and said recording-sheet supply means.

8. The apparatus according to claim 7, wherein said serial recording means employs a serial ink-jet recording method.

9. A facsimile apparatus equipped with receiving, transmitting and copying functions, comprising:

reading means for reading an image of an original;

original conveying means for picking up originals, a plurality of which are supplied upstream of said reading means, and conveying them to said reading means;

serial recording means having a carriage motor which drives said serial recording means for serially recording prescribed images on recording sheets;

recording-sheet conveying means for conveying the recording sheets to said recording means;

recording-sheet supply means for supplying the recording sheets to the entrance port of said recording-sheet conveying means, wherein the supplying by said recording-sheet supply means and the conveyance by said original conveying means are performed separately with a time difference between them;

recording-sheet storage means for stacking a plurality of the recording sheets, each recording sheet being a cut sheet having a predetermined size and being supplied to the entrance port of said recording-sheet conveying means after being picked-up in a sheet-by-sheet fashion by said recording-sheet supply means; and a common drive motor which selectively drives said original conveying means and said recording-sheet supply means.

10. The apparatus according to claim 9, wherein said serial recording means employs a serial ink-jet recording method.

11. The apparatus according to claim 9, wherein said recording-sheet supply means comprises a roller having one-way clutch, and when one recording sheet is conveyed to an entrance port of said recording-sheet conveying means, said roller becomes free.

12. The apparatus according to claim 9, further comprising a rocking mechanism in which a rocking direction thereof is set in dependence upon direction of rotation of said common drive motor in order to drive said original conveying means and said recording-sheet supply means in prescribed fashion by said common drive motor;

said rocking mechanism meshing with a power transmission mechanism of said original conveying means and a power transmission mechanism of said recording-sheet supply means.

13. The apparatus according to claim 9, wherein a one-way clutch is interposed in a power transmission mechanism system, said one-way clutch transmitting power to one of a power transmission mechanism of said original conveying means and a power transmission mechanism of said recording-sheet supply means in dependence upon direction of rotation of said common drive motor in order to drive said original conveying means and said recording-sheet supply means in prescribed fashion by said common drive motor.

14. The apparatus according to claim 9, further comprising an actuator for moving a drive gear of said common drive motor in a direction along the rotational axis of said drive gear to one of a power transmission mechanism of said original conveying means and a power transmission mechanism of said recording-sheet supply means to thereby mesh said drive gear with said one of the power transmission mechanisms in order to drive said original conveying means and said recording-sheet supply means in prescribed fashion by said common drive motor.

15. The apparatus according to claim 9, wherein a control panel is provided on an inclined side of an apparatus main body tapering toward a front side, said reading means is arranged below said control panel, said recording-sheet supply means picks up a plurality of the recording sheets one-by-one, the ecording sheets being stacked in a recording sheet storage means, and supplies the picked-up recording sheet to the entrance port of said recording-sheet conveying means, said recording-sheet conveying means and recording-sheet supply means are disposed at a rearward portion of said apparatus main body, and the original and recording sheets are each conveyed by selectively driving said original conveying means and said recording-sheet supply means in prescribed fashion by said common drive motor.

16. The apparatus according to claim 9, wherein said reading means comprises a contact sensor and a contact roller for reading an original while in contact with a surface thereof, and said recording-sheet storage means comprises a cartridge wherein the plurality of stacked recording sheets are accommodated in said cartridge and are freely loaded and unloaded via an opening in the front side of an apparatus main body.

* * * * *

UNITED STATES PATENT AND TRADEMARK OFFICE
CERTIFICATE OF CORRECTION

PATENT NO. : 5,552,902

DATED : September 3, 1996

INVENTOR : TAKESHI KOHNO

It is certified that error appears in the above-identified patent and that said Letters Patent is hereby corrected as shown below:

SHEET 5 of 7

Figure 5:
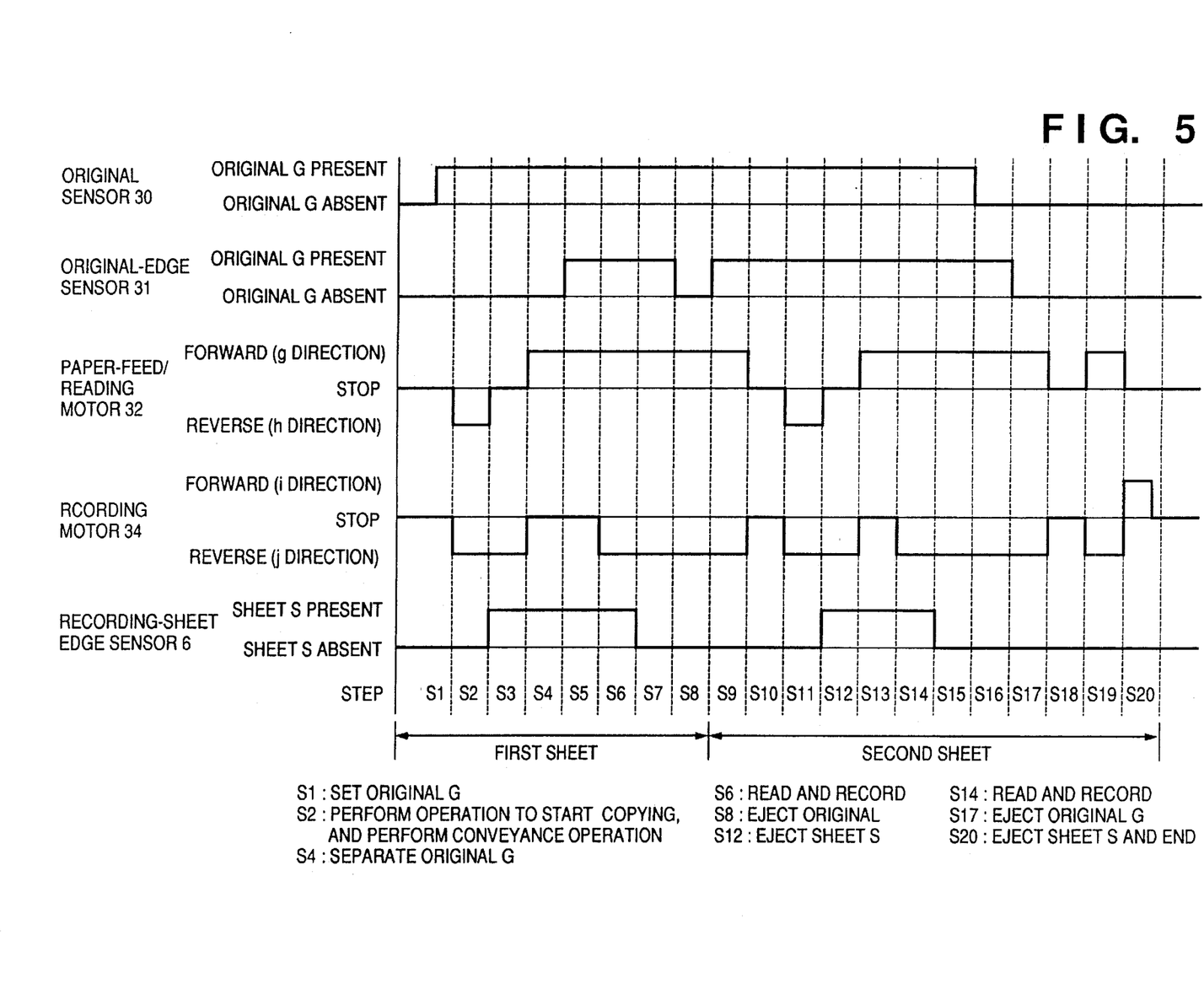
FIG. 5 is a timing chart showing motor-drive control in the facsimile apparatus.

FIG. 5  "RCORDING" should read --RECORDING--.

COLUMN 2

Line 15,  "object" should read --another object--;
   Line 18,  "get" should read --gotten--;
   Line 63,  "recording-speed" should read --recording sheet--.

COLUMN 3

Line 14,  "reduces" should read --reduce--;
   Line 43,  "apparatus." should read --invention.--.

COLUMN 6

Line 36,  "carriage 9" should read --cartridge 9--;
   Line 42,  "$V_p > V_p$." should read --$V_f > V_p$--.

UNITED STATES PATENT AND TRADEMARK OFFICE
CERTIFICATE OF CORRECTION

PATENT NO. : 5,552,902

DATED : September 3, 1996

INVENTOR : TAKESHI KOHNO

It is certified that error appears in the above-identified patent and that said Letters Patent is hereby corrected as shown below:

COLUMN 7

Line 33,   "rotated" should read --rotates--;
   Line 51,   "s" should read --is--;
   Line 58,   "recorded" should read --recording--.

COLUMN 8

Line 10,   "5" should be deleted.

COLUMN 10

Line 1,    "a" should read --a--;
   Line 19,   "a" should read --a--;
   Line 37,   "prescribed" should read --a prescribed--.

UNITED STATES PATENT AND TRADEMARK OFFICE
CERTIFICATE OF CORRECTION

PATENT NO. : 5,552,902

DATED : September 3, 1996

INVENTOR : TAKESHI KOHNO

It is certified that error appears in the above-identified patent and that said Letters Patent is hereby corrected as shown below:

COLUMN 11

```
Line 3,    "picked-up" should read --picked up--;
Line 16,   "a" should read --a--;
Line 32,   "picked-up" should read --picked up--;
Line 42,   "one-way" should read --a one-way--.
```

Signed and Sealed this

Eighth Day of April, 1997

*Attest:*

BRUCE LEHMAN

*Attesting Officer*     Commissioner of Patents and Trademarks